June 10, 1958     L. H. ROWLEY ET AL     2,837,925
DIFFERENTIAL LIMIT STOP
Filed April 15, 1957     2 Sheets-Sheet 2
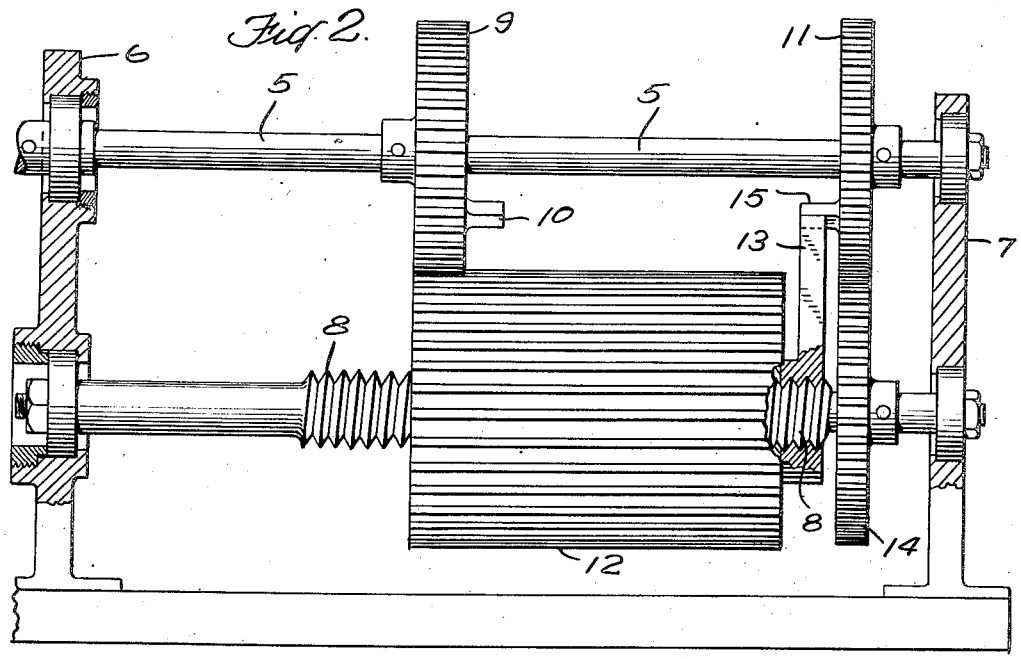
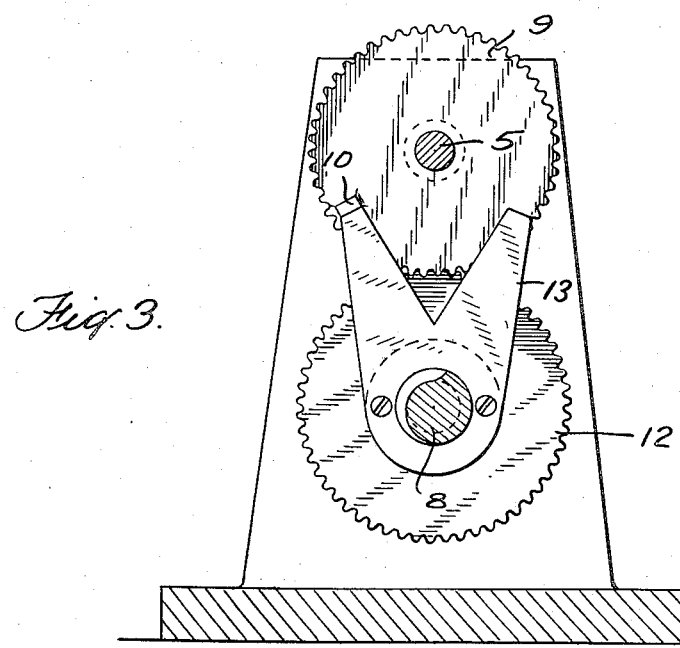
INVENTORS
LOTHAIR H. ROWLEY
PATRICK J. McKEOWN
ATTORNEY

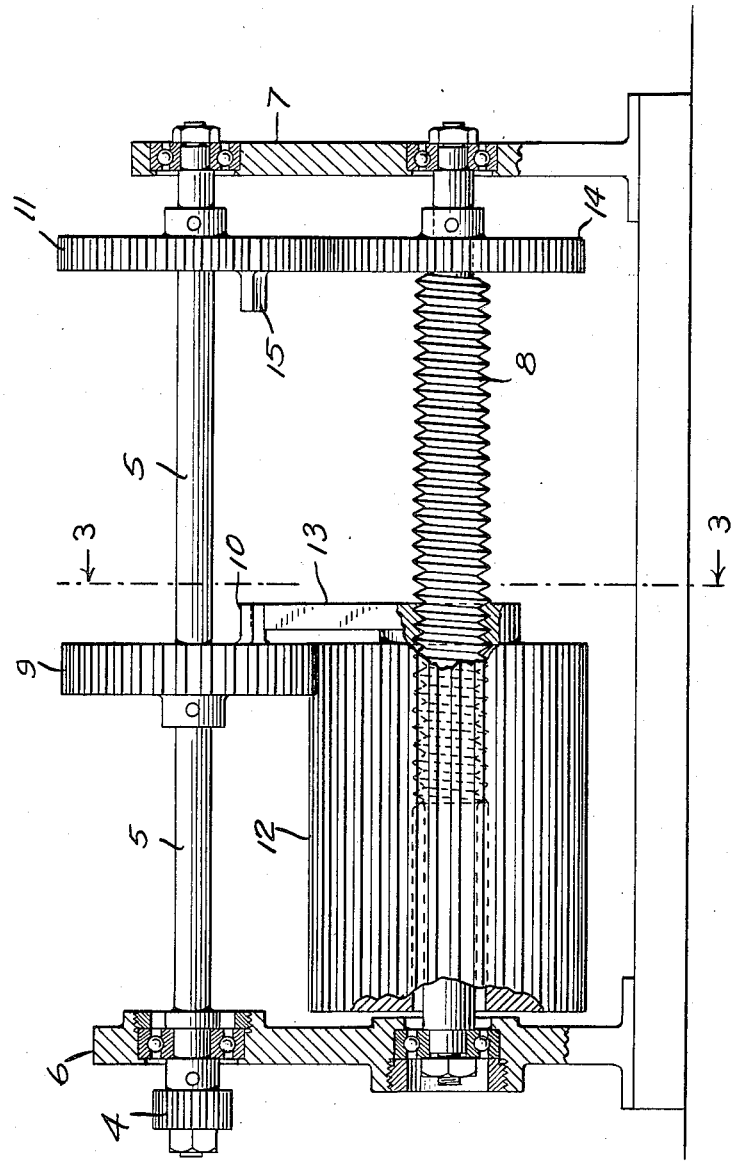

United States Patent Office 2,837,925
Patented June 10, 1958

2,837,925

DIFFERENTIAL LIMIT STOP

Lothair H. Rowley and Patrick J. McKeown, Syosset, N. Y., assignors to The Sperry Rand Corporation Ford Instrument Company Division, Long Island, N. Y., a corporation of Delaware Application April 15, 1957, Serial No. 652,751

4 Claims. (Cl. 74—10.2)

This invention relates to limit stops and particularly to an improvement in the basic "hunting tooth" or "flying arm" type of stop permitting a large increase in the number of input turns between stops without substantially increasing the size of the mechanical structure.

The "hunting tooth" stop has peculiar design limitations in that its maximum input turns between stops must account for the weight and size requirements of the meshing gears whose flying arms are brought into contacting phase agreement. The number of input turns between stops depends on the gear ratio or teeth differential which may be reduced in order to increase the turns. One obvious way to reduce the gear ratio is to increase the size of the gears. So that the input can be increased without changing the size of the gears the invention provides means for causing one of the flying arms to travel axially between stops in the manner of a "traveling nut stop." Accordingly the arm of one hunting tooth gear is mounted on a feed screw which is driven by a gear train which includes the other hunting tooth gear. The improved stop would incorporate therefore the advantages of the two basic types of limit stop so that the number of input turns is higher than either of the types from which it is derived assuming size and weight limitations are present.

One object of the invention therefore is to provide an improved limit stop which effectively increases the allowed input turns without exceeding normal size requirements.

A more complete understanding of the invention may be gained by reading the following description of one embodiment thereof in conjunction with the accompanying drawings in which:

Fig. 1 is a front elevation of a preferred embodiment of the invention with supporting end members in cross section; and Fig. 2 is a front elevation similar to Fig. 1 in which the elongated gear is in its extreme right hand position; and Fig. 3 is a section taken on line 3—3 of Fig. 1.

According to the drawings an input gear 4 is mounted on input shaft 5 journaled in end brackets 6 and 7. Similarly feed screw shaft 8 is journaled in the end brackets 6 and 7, the feed screw shaft being parallel with the input shaft 5. A gear 9 having a flying stop 10 attached thereto is mounted on the input shaft 5 and a driving gear 11 is also mounted on the shaft 5 proximate the end bracket 7.

An internally threaded elongated gear 12, establishing a preselected gear ratio with the gear 9 is mounted for axial travel on the feed screw shaft and is in meshing engagement with the gear 9. A bifurcated flying arm 13 is fixed to the elongated gear 12 for rotation therewith. A driven gear 14 is secured to the feed screw shaft 8 so as to engage the gear 11 on the shaft 5. The gear 11 is provided with a stop 15 which rotates therewith and is adapted to make positive engagement with the flying arm 13 at the completion of its axial movement in the direction of the bracket 7.

In order to aid the understanding of the operation of the differential limit stop, it is assumed that the gear 12 has one less tooth than the gear 9. The gears 11 and 14 have the same pitch diameter (distance between centers of the shaft 5 and the lead screw shaft 8) but the number of gear teeth on these gears is different from those on gears 9 and 12. For example, if the gear 9 has 48 teeth and the gear 12 has 47 teeth, the gear 11 would have, let us say, 49 teeth while the gear 14 would have 46 teeth).

The lack of one tooth between the gears 9 and 12 causes the same type of action as occurs in the "hunting tooth" limit stop. However, gear 12 is threaded on the lead screw shaft. The rotation of the gear 12 would cause motion of this gear sideways along lead screw shaft 8 if the shaft 8 remains stationary. However, the lead screw shaft 8 is geared to the input gear 9 through the gears 11 and 14 and the shaft 5. The lead screw shaft 8 therefore rotates in a direction to slow down the translatory motion of the gear 12. If the lead screw shaft were rotating at the same speed as the gear 12, the latter would not translate. However, the pitch of the lead screw shaft and ratio of the gears 11 and 14 are such as to translate the gear 12 far enough so that during rotation of the gear 9 sufficient to cause interference between the stop 10 and flying arm 13, the gear 12 and arm 13 will move sufficiently to allow the arm to pass the stop 10. For example, if the hunting tooth arrangement will allow 40 turns of the gear 9 from the stop position (mating of the stop 10 and flying arm 13) until the stop 10 and the arm again interfere, then the gear 12 and the arm must move sideways the thickness of the arm in order to prevent interference between the stop 10 and arm 13.

In order to determine the width of the stop 10 for a 40 turn hunting tooth limit stop of the disclosed type so that the lead of the gear 12 and its arm will be sufficient to pass the stop on the fortieth turn, it is necessary to calculate the lead of the feed screw. The lead of the feed screw will depend on its effective turns for the assumed gear ratios and its pitch. The number of turns which are effective in causing the gear 12 to move along the feed screw shaft is equal to $T_f - T_g$ when $T_f$ is feed screw turns and $T_g$ is gear 12 turns.

Since $$T_f = \frac{Nd}{Ne} \times Td$$

$$= \frac{48}{47} \times 40$$

$$= 40.85106 \text{ turns}$$

where $Nd$ is the number of teeth on gear 11, $Ne$ is the number of teeth on gear 14 and $Td$ is the number of input turns of the driving gear 11.

And $$T_s = \frac{Nb}{Ng} \times T_b$$

$$= \frac{47}{48} \times 40$$

$$= 39.16667 \text{ turns}$$

where $Nb$ is the number of teeth on the gear 9, and $Ng$ is the number of teeth of the gear 12 and $Tb$ is the number of input turns of the driving gear 9.

Then, for every 40 turns of input 1.684397 turns are produced to make the gear 12 move along the feed screw shaft.

Assuming the feed screw is 32 pitch, one effective turn will move the gear 12, $\frac{1}{32}$ of an inch. Forty input turns causes the gear 12 to translate $(1.684397 \times \frac{1}{32})$ inches or .05264 inch. Therefore, the width of the stop 10 must be less than .05264 inch.

If it is desired that the limit stop be capable of receiving 400 input turns, then the distance between stops need be only ten times the lead for forty input turns or .5264 inch of feed screw between stops. The enabling of relatively small, structural dimensions for a device which has many times the capacity of a conventional limit stop is thus apparent.

The scope of invention is defined in the appended claims; in which:

1. A limit stop mechanism of the character described comprising a rotatably mounted input shaft, a rotatably mounted helical screw shaft disposed in spaced parallel relation to said input shaft, a first gear secured to said input shaft in fixed position for rotation therewith, a second gear secured to said input shaft in spaced relation to said first gear for rotation with said input shaft and said first gear, a third gear which is secured to said helical screw shaft in mesh with said second gear and through which said screw shaft is rotated by said second gear, an elongated gear mounted upon said screw shaft in mesh with said first gear and adapted to be translated back and forth along said screw shaft by the rotation of said screw shaft and to be rotated by said first gear during the translation thereof along said screw shaft, a pair of opposed abutments one of which is secured to the face of said first gear and the other of which is secured to the opposed face of said second gear, a flying arm disposed between said pair of abutments and secured to said elongated gear for rotation and translation therewith, said flying arm being adapted to engage the abutment on said first gear and thereby stop the rotation of said input shaft when said input shaft is rotated in one direction and to engage the abutment on said second gear and thereby stop the rotation of said input shaft when said input shaft is rotated in the opposite direction.

2. A limit stop mechanism as defined in claim 1, in which said first gear is provided with "X" number of teeth and said elongated gear is provided with $X-Y$ number of teeth.

3. A limit stop mechanism as defined in claim 2, in which the width of said flying arm is not greater than the distance said elongated gear and said flying arm are translated along said screw shaft during "X" number of revolutions of said first gear.

4. A limit stop mechanism as defined in claim 1, in which said first gear is provided with "X" number of teeth, said second gear is provided with a greater number of teeth than said first gear, said elongated gear is provided a lesser number of teeth than said first gear, and said third gear is provided with a lesser number of teeth than said elongated gear.

References Cited in the file of this patent

UNITED STATES PATENTS

| | | |
|---|---|---|
| 2,227,114 | Tear | Dec. 31, 1940 |
| 2,631,709 | Anderson | Mar. 17, 1953 |